United States Patent
Kanda et al.

(10) Patent No.: US 10,964,480 B2
(45) Date of Patent: Mar. 30, 2021

(54) CAPACITOR MODULE HAVING INTERVENING INWARD FACING PORTION

(71) Applicant: DENSO CORPORATION, Kariya (JP)

(72) Inventors: Takayuki Kanda, Kariya (JP); Daigo Hamajima, Kariya (JP)

(73) Assignee: DENSO CORPORATION, Kariya (JP)

( * ) Notice: Subject to any disclaimer, the term of this patent is extended or adjusted under 35 U.S.C. 154(b) by 139 days.

(21) Appl. No.: 16/232,319

(22) Filed: Dec. 26, 2018

(65) Prior Publication Data

US 2019/0198246 A1 Jun. 27, 2019

(30) Foreign Application Priority Data

Dec. 27, 2017 (JP) .............................. JP2017-251932

(51) Int. Cl.
*H01G 4/258* (2006.01)
*H01G 4/38* (2006.01)
*H01G 4/224* (2006.01)

(52) U.S. Cl.
CPC ............. *H01G 4/258* (2013.01); *H01G 4/224* (2013.01); *H01G 4/38* (2013.01)

(58) Field of Classification Search
CPC ........... H01G 4/258; H01G 4/38; H01G 4/224
See application file for complete search history.

(56) References Cited

U.S. PATENT DOCUMENTS

| | | | | |
|---|---|---|---|---|
| 5,016,139 A | * | 5/1991 | Stopa ................... | H05K 5/0247 307/150 |
| 2014/0285969 A1 | * | 9/2014 | Kojima ................. | H01G 4/38 361/689 |
| 2014/0301059 A1 | * | 10/2014 | Kusada ............... | H05K 7/1432 361/810 |
| 2014/0377623 A1 | * | 12/2014 | Pyzza ..................... | H01G 2/08 429/120 |

FOREIGN PATENT DOCUMENTS

| JP | 10223474 A | * | 8/1998 |
| JP | 2001326131 A | * | 11/2001 |
| JP | 2009044920 A | * | 2/2009 |
| JP | 2009188158 A | * | 8/2009 |
| JP | 2010040832 A | * | 2/2010 |
| JP | 2012134339 A | * | 7/2012 |
| JP | 2014-068449 A |   | 4/2014 |
| JP | 2014078549 A | * | 5/2014 |

* cited by examiner

*Primary Examiner* — David M Sinclair
(74) *Attorney, Agent, or Firm* — Oliff PLC

(57) ABSTRACT

A capacitor module is provided which includes a plurality of capacitors, a capacitor case, and a sealing resin with which the capacitor case is filled to seal the capacitors in the capacitor case. The capacitor case includes inward-facing portions of an outer wall thereof each of which bulges or protrudes between every adjacent two of the capacitors. As viewed in a height-wise direction perpendicular both to a direction in which the inward-facing portions protrude and to a direction in which two of the capacitors adjacent each other across one of the inward-facing portions are aligned, (Continued)

the intervening inward-facing portion traverses a line segment passing through centers of the two adjacent capacitors. This structure minimizes thermal interference between the capacitors.

8 Claims, 20 Drawing Sheets

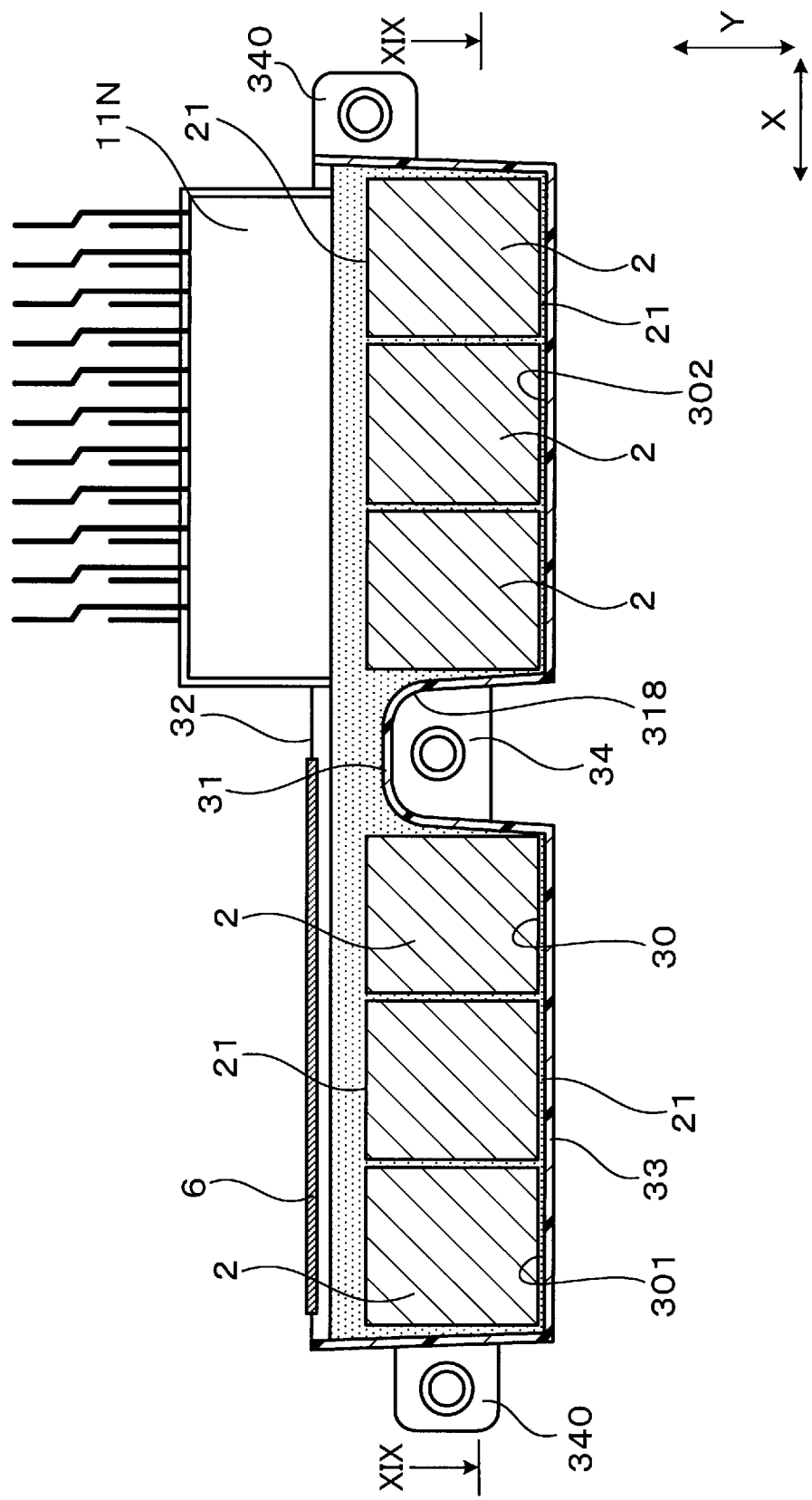

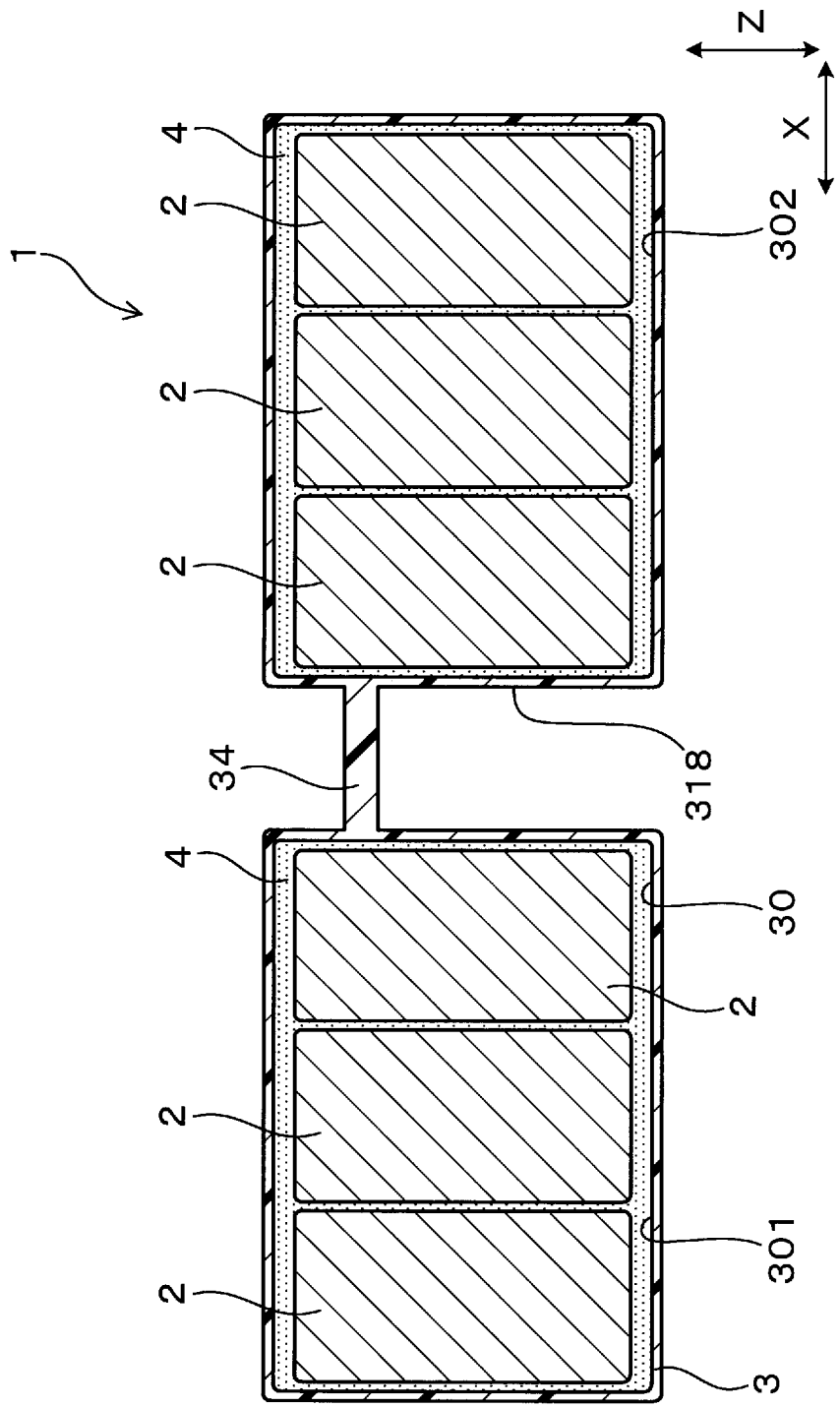

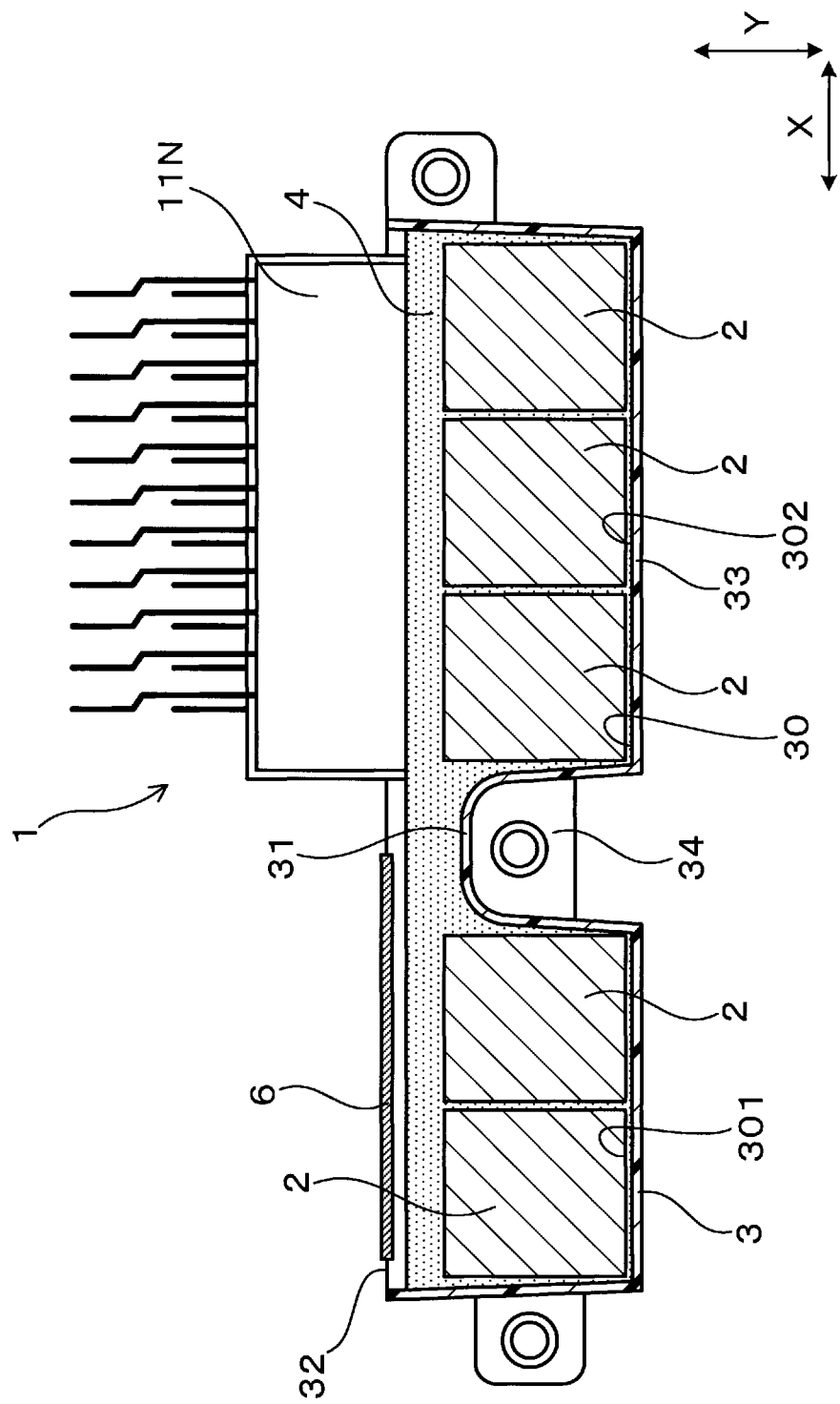

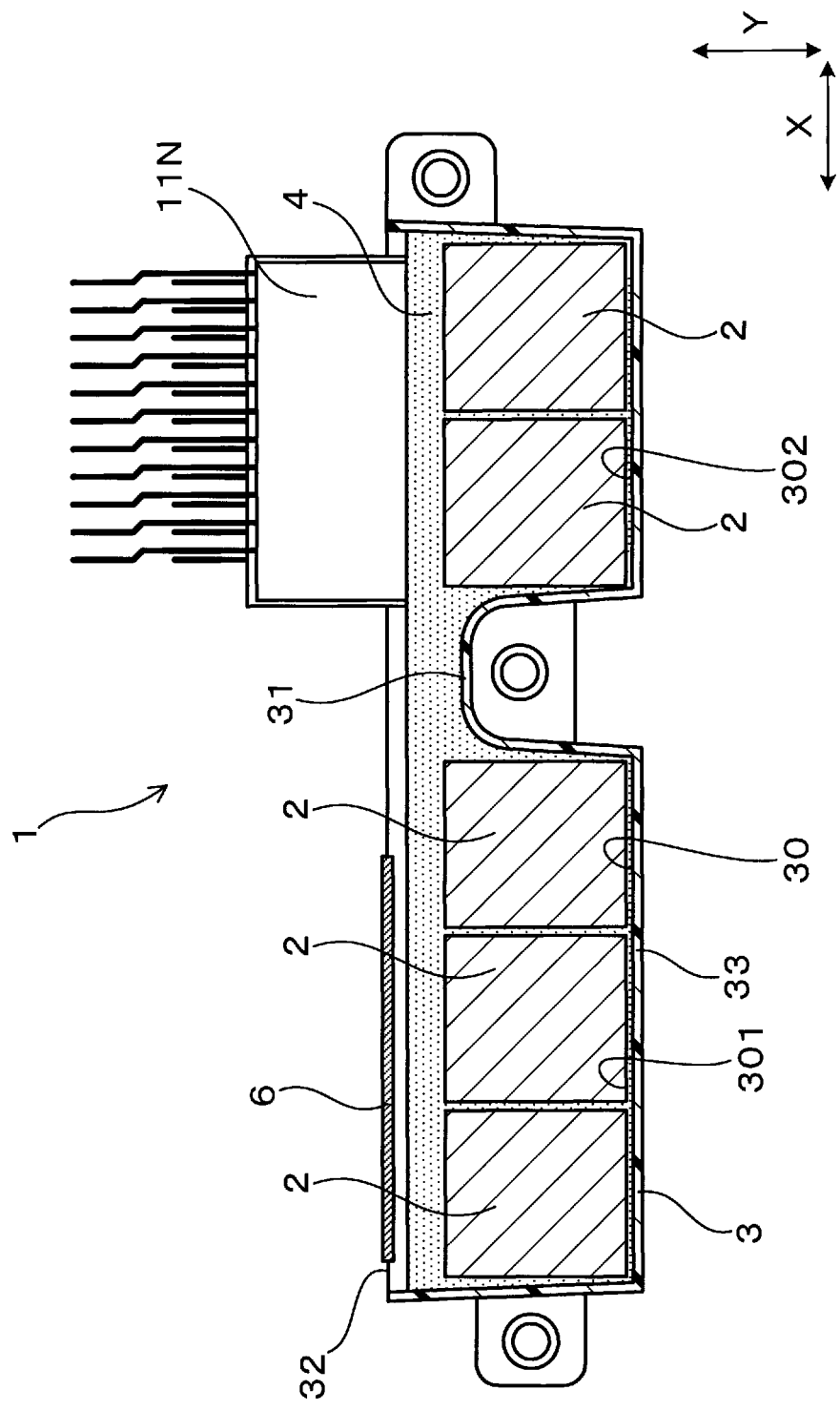

CAPACITOR MODULE HAVING INTERVENING INWARD FACING PORTION

CROSS REFERENCE TO RELATED DOCUMENT

The present application claims the benefit of priority of Japanese Patent Application No. 2017-251932 filed on Dec. 27, 2017, the disclosure of which is incorporated herein by reference.

BACKGROUND

1 Technical Field

This disclosure relates generally to a capacitor module made up of a plurality of capacitors.

2 Background Art

Japanese Patent First Publication No. 2014-68449 discloses an electric power converter which has installed therein a capacitor module equipped with a plurality of capacitors. The capacitor module includes a capacitor case in which the capacitors are installed and hermetically sealed by resin.

The capacitor module equipped with the capacitors arranged therein has a drawback in that thermal interference occurs between every adjacent two of the capacitors, in other words, arrangement of the capacitors which are sealed close to each other within the capacitor case results in thermal interference between the adjacent capacitors.

The capacitor case, as disclosed in the above publication, has formed therein a recess arranged between every adjacent two of the capacitors. Each of the recesses is, however, arranged in a dead space between facing curved side surfaces of the adjacent capacitors and thus usually subjected to the thermal interference between the adjacent capacitors.

SUMMARY

It is an object of this disclosure to provide a capacitor module which is capable of minimizing thermal interference between capacitors.

According to one aspect of the disclosure, there is provided a capacitor module which comprises: (a) a plurality of capacitors; (b) a capacitor case in which the capacitors are disposed; and (c) a sealing resin with which the capacitor case is filled to seal the capacitors.

The capacitor case has inward-facing portions which are formed by portions of an outer wall of the capacitor case and protrude inward between every adjacent two of the capacitors.

At least one of the inward-facing portions is an intervening inward-facing portion. As viewed in a height-wise direction perpendicular both to a direction in which the inward-facing portions protrude and to a direction in which two of the capacitors adjacent each other across one of the inward-facing portions are aligned, the intervening inward-facing portion traverses a line segment passing through centers of the two adjacent capacitors.

The capacitor case of the capacitor module is, as described above, equipped with the intervening inward-facing portion. As viewed in the height-wise direction, the intervening inward-facing portion is arranged to traverse the line segment passing through the centers of the two adjacent capacitors. In other words, the intervening inward-facing portion is located between adjacent two of the capacitors. This results in an increased interval between two of the capacitors which are arranged adjacent each other across the intervening inward-facing portion, thereby reducing thermal interference between the adjacent capacitors.

The intervening inward-facing portion that is a portion of the capacitor case is interposed between the two adjacent capacitors, thereby decreasing accumulation of heat between the adjacent capacitors.

As apparent from the above discussion, the capacitor module is capable of minimizing the thermal interference between the capacitors.

In this disclosure, symbols in brackets represent correspondence relation between terms in claims and terms described in embodiments which will be discussed later, but are not limited only to parts referred to in the disclosure.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 18 is a sectional view which illustrates a capacitor module according to the fifth embodiment;

FIG. 19 is a sectional view taken along the line XIX-XIX in FIG. 18;

FIG. 20 is a sectional view which illustrates a capacitor module according to the sixth embodiment; and FIG. 21 is a sectional view which illustrates a capacitor module according to the seventh embodiment.

DESCRIPTION OF THE PREFERRED EMBODIMENTS

First Embodiment

The capacitor module 1 according to an embodiment will be described below with reference to FIGS. 1 to 10.

Figure 1:
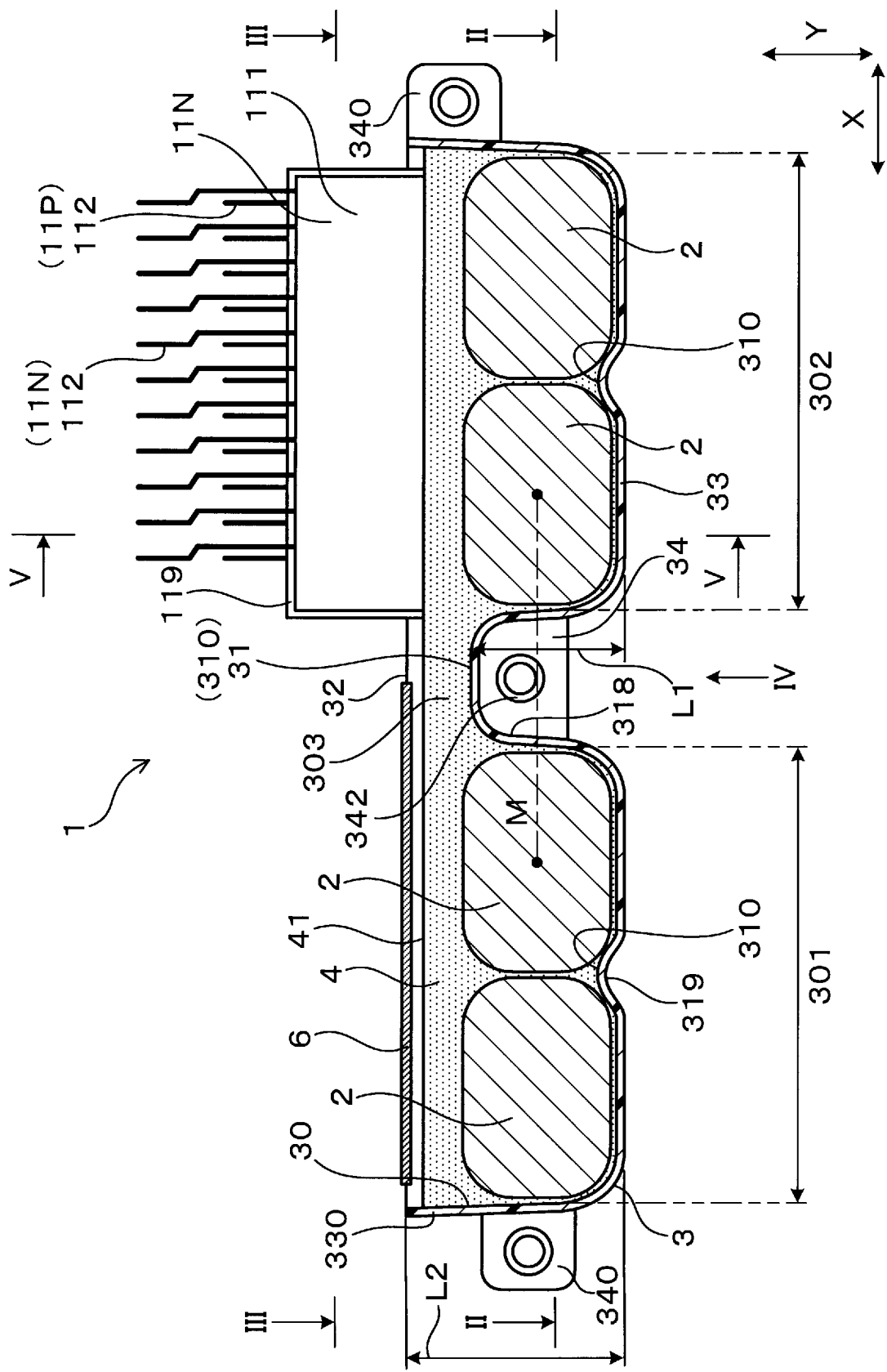
FIG. 1 is a sectional view, as taken along the line I-I in FIG. 3, which illustrates a capacitor module according to the first embodiment.
Figure 2:
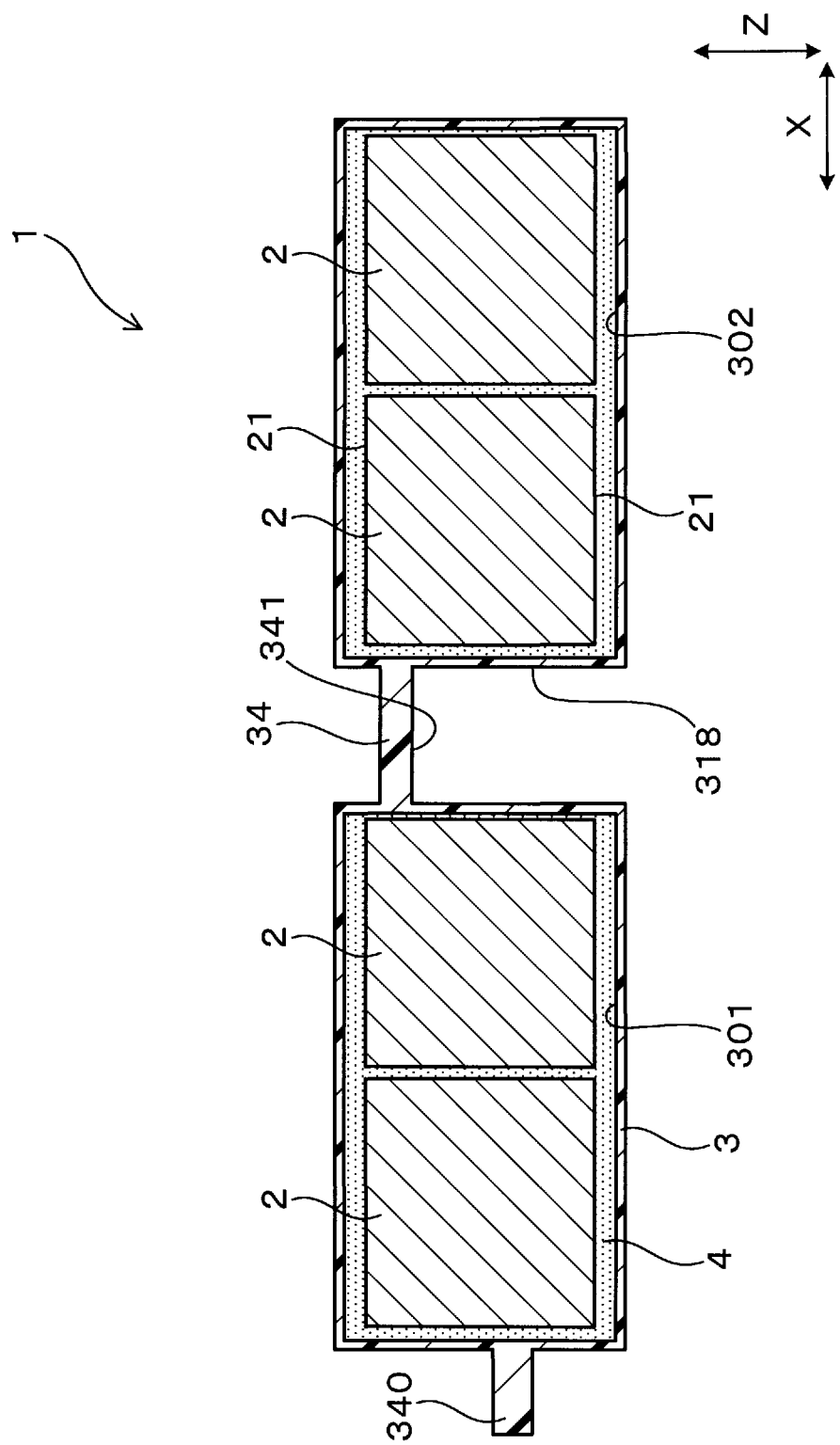
FIG. 2 is a sectional view taken along the line II-II in FIG. 1.

The capacitor module 1, as clearly illustrated in FIGS. 1 and 2, includes a plurality of capacitors 2, the capacitor case 3, and the sealing resin 4. The capacitor case 3 has the capacitors 2 mounted therein. The capacitor case 3 is filled with the sealing resin 4 to hermetically seal the capacitors 2 within the capacitor case 3.

The capacitor case 3 has the inward-facing portion 310 disposed between every adjacent two of the capacitors 2. Each of the inward-facing portions 310 is formed by a portion of an outer wall of the capacitor case 3 which protrudes or bulges inwardly between the adjacent capacitors 2.

The inward-facing portions 310 include at least one intervening inward-facing portion 31 in the following way. Specifically, as viewed in the height-wise direction Z, the intervening inward-facing portion 31 is one of the inward-facing portions 310 shaped to traverse a line segment M passing through the centers of the two adjacent capacitors 2. The height-wise direction Z, as referred to herein, a direction perpendicular both to a direction Y in which the intervening inward-facing portion 31 (or the inward-facing portions 310) bulges or protrudes from the wall of the capacitor case 3 and to a direction X in which the two capacitors 2 arranged across the intervening inward-facing portion 31 (or the inward-facing portions 310) are aligned.

The height-wise direction Z will also be merely referred to below as direction Z.

The capacitors 2 are arranged in line. In other words, the capacitors 2 are aligned substantially straight in this embodiment. The capacitor case 3 has first and second regions 301 and 302 which are defined on opposite sides of the intervening inward-facing portion 31 in the array direction or direction X in which the capacitors 2 are arrayed in line. The first and second regions 301 and 302 have the same number of capacitors 2 disposed therein.

The plurality of capacitors 2 are arranged in each of the first and second regions 301 and 302 on the opposite sides of the intervening inward-facing portion 31. In this embodiment, the two capacitors 2 are mounted in each of the first and second regions 301 and 302.

The capacitor module 1, as clearly illustrated in FIGS. 1 to 6, has the capacitors 2 disposed in the resinous capacitors case 3 along with the sealing resin 4. The capacitor case 3 has the open surface 32 that is one of surfaces thereof. The open surface 32 faces in one of opposite directions in the direction Y. The capacitor case 3 has the bottom wall 33 and the peripheral wall 330 as an outside wall thereof. The bottom wall 33 is opposed to the open surface 32. The peripheral wall 330 extends from the bottom wall 33 in the direction Y. The capacitor case 3 has the storage chamber 30 surrounded by the bottom wall 33 and the peripheral wall 330. The capacitors 2 are arranged inside the storage chamber 30.

Figure 4:
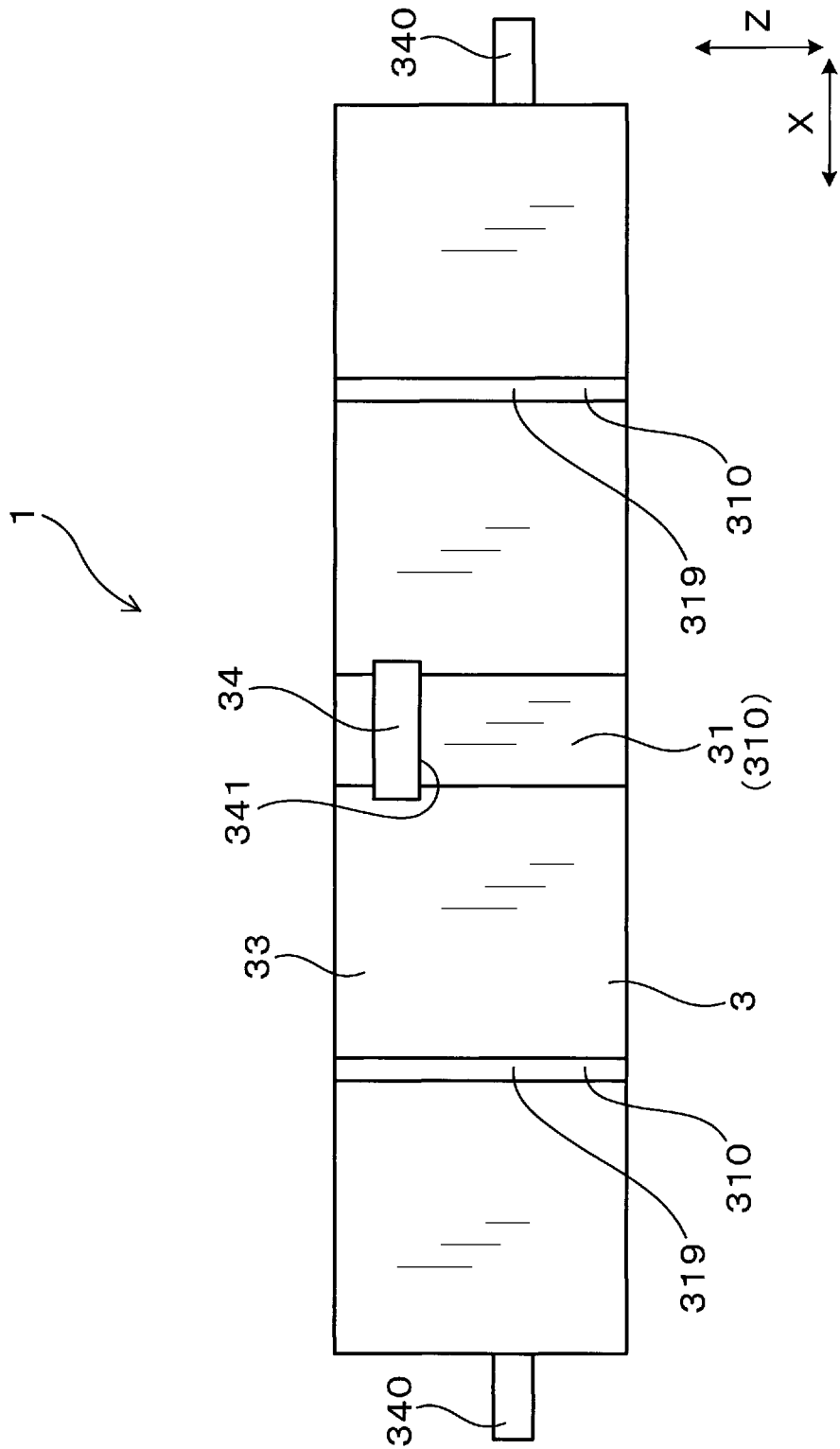
FIG. 4 is a side elevation as viewed in an arrow IV in FIG. 2.
Figure 6:
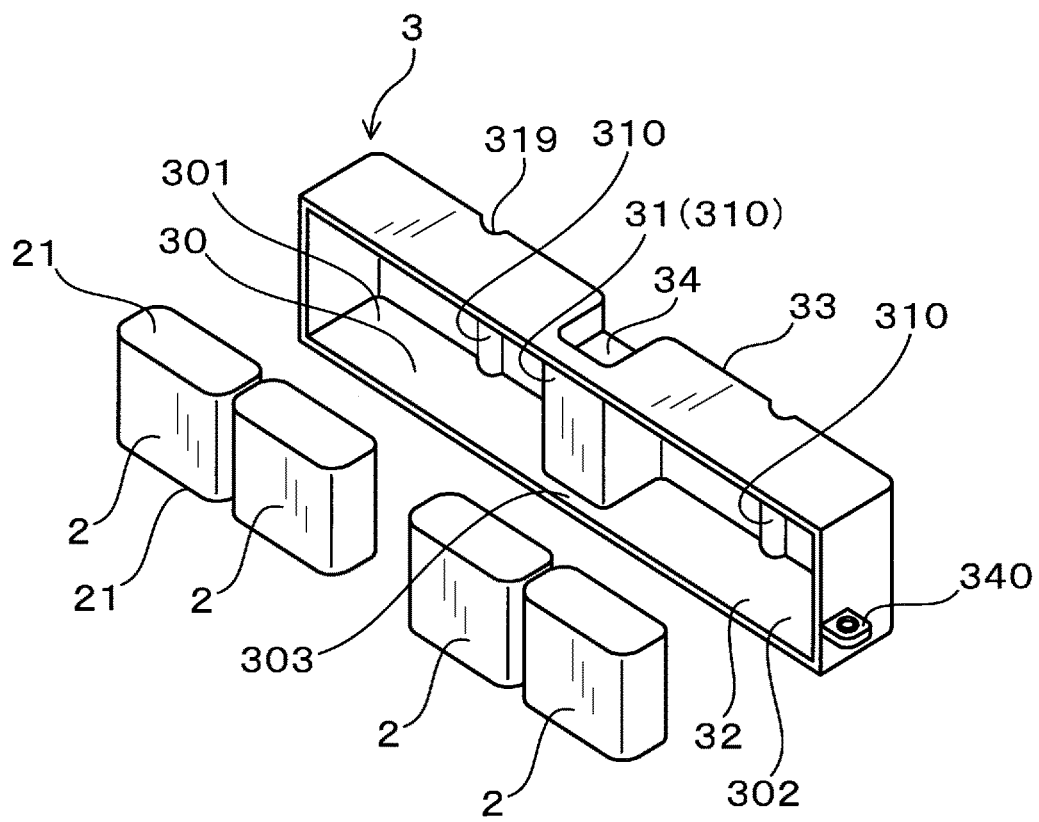
FIG. 6 is an exploded perspective view which illustrates a capacitor module according to the first embodiment.

The capacitor case 3 is of a substantially cuboid shape as a whole and has a length extending in the array direction of the capacitors 2, i.e., the direction X. The bottom wall 33 of the capacitor case 3, as illustrated in FIGS. 1, 4, and 6, has the inward-facing portion 310. Specifically, the bottom wall 33 has the three inward-facing portions 310.

A middle one of the inward-facing portions 310 arrayed in the direction X is the intervening inward-facing portion 31. The storage chamber 30 of the capacitor case 3 is broken by the intervening inward-facing portion 31 down into two parts: the first region 301 and the second region 302 arranged adjacent each other in the direction X. The storage chamber 30 is, however, not fully divided into the first region 301 and the second region 302. In other words, the first region 301 and the second region 302 are not fully isolated from each other, but partially communicate with each other via the connecting path 303 located close to the open surface 32 in the storage chamber 30.

The intervening inward-facing portion 31 fully occupies a dimension of the capacitor case 3 in the direction Z. Similarly, the other inward-facing portions 310 fully occupy the dimension of the capacitor case 3 in the direction Z.

The two capacitors 2 are, as clearly illustrated in FIGS. 1 and 2, mounted in the first region 301 of the storage chamber 30. Similarly, the two capacitors 2 are mounted in the second region 302 of the storage chamber 30. In this embodiment, the total of four capacitors 2 are arranged inside the capacitor case 3. All the capacitors 2 are identical in shape and kind with each other.

Specifically, each of the capacitors 2 is implemented by a film capacitor wrapped with a metallized film and has electrode surfaces 21 that are ends thereof opposed to each other in a direction of an axis about which the film is wound (which will also be referred to below as a winding axial direction). In this embodiment, the winding axial direction of the capacitors 2 is the direction Z. In other words, the capacitors 3 are oriented in the capacitor case 3 to have the winding axial direction coinciding with the direction Z. As viewed in the direction Z in FIG. 1, each of the capacitors 2 has four round corners in a substantially rectangular shape. Each of the capacitors 2 is arranged to have a dimension in the direction X which is greater than that in the direction Y.

The sealing resin 4 is disposed in the storage chamber 30 of the capacitor case 3 to hermetically seal the capacitors 2. The sealing resin 4 is made of, for example, epoxy resin. The sealing resin 4 has the potting surface 41 exposed to the open surface 32 of the capacitor case 3. The potting surface 41 is a flat surface extending perpendicular to the direction Y.

Figure 3:
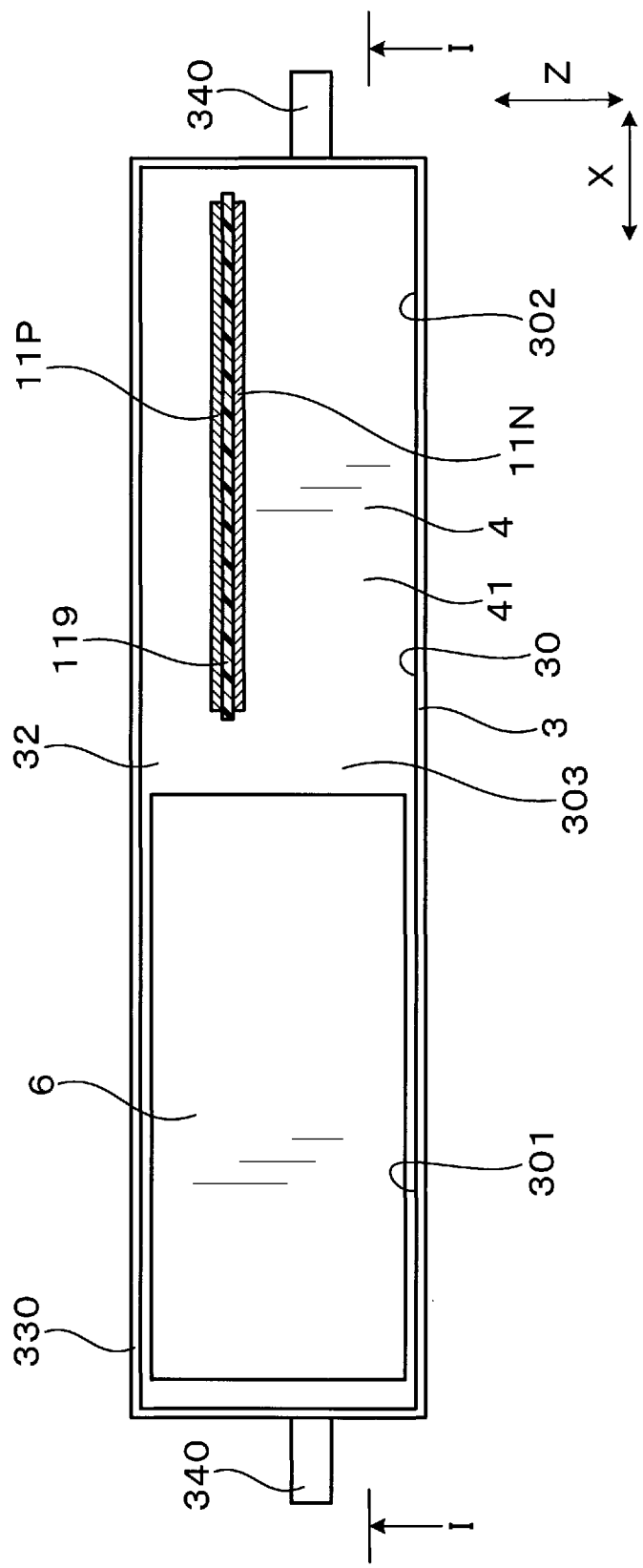
FIG. 3 is a sectional view taken along the line III-III in FIG. 1.
Figure 5:
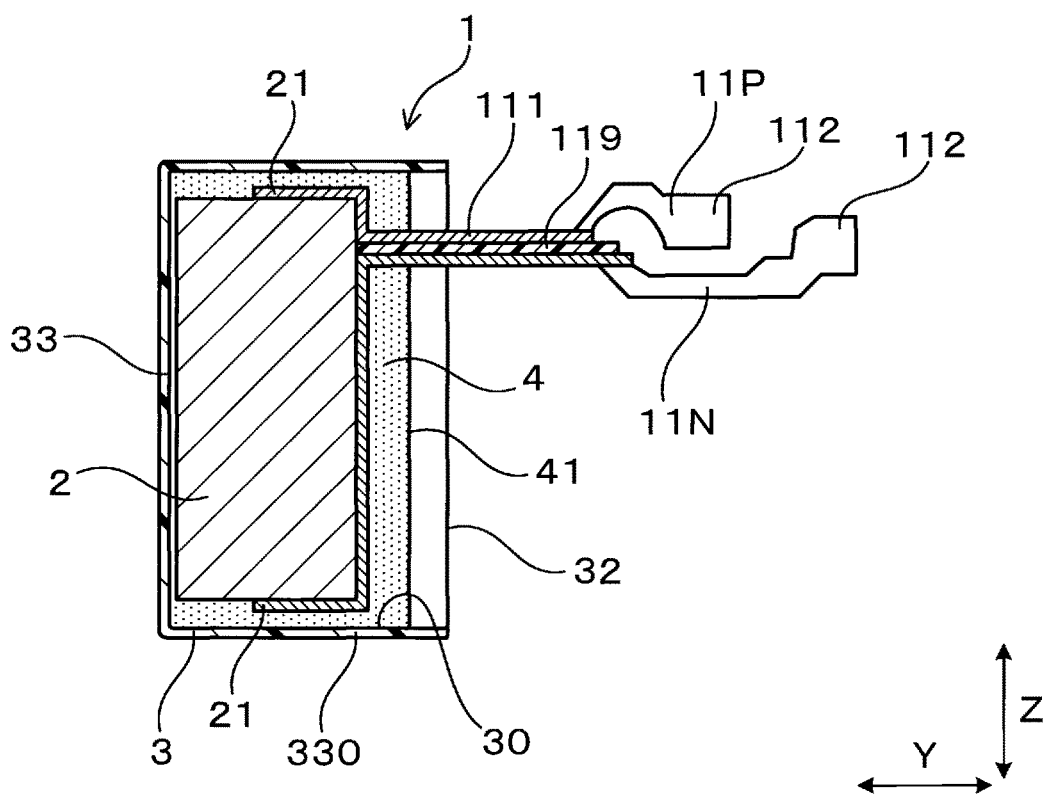
FIG. 5 is a sectional view taken along the line V-V in FIG. 1.

The capacitor module 1 is, as illustrated in FIGS. 1, 3, and 5, equipped with capacitor bus bars 11P and 11N connected to positive and negative poles of each of the capacitors 2. The capacitor bus bars 11P and 11N protrude outside from the potting surface 41. Specifically, the capacitor bus bars 11P and 11N protrude from the potting surface 41 in the second region 302.

Each of the capacitors 2 has ends which are opposed to each other in the direction Z and form the positive electrode surface 21 and the negative electrode surface 21, respectively. The positive capacitor bus bars 11P are connected to the positive electrode surfaces 21 of the capacitors 2, while the negative capacitor bus bars 11N are connected to the negative electrode surfaces 21 of the capacitors 2. In other words, the capacitors 2 are connected in parallel to each other using the capacitor bus bars 11P and 11N. Joints of the capacitor bus bars 11P and 11N with the electrode surfaces 21 of the capacitors 2 are disposed inside the sealing resin 4.

The capacitor bus bars 11P and 11N, as can be seen in FIG. 3, face each other in the direction Z and protrude from the potting surface 41. Specifically, the capacitor bus bars 11P and 11N have portions 111 facing each other in the direction Z and also have a plurality of connecting terminals 112 which extend from outside ends of the portions 111 and are connected to the semiconductor modules 52, which will be described later in detail. The two facing portions 111 are laid to overlap each other through the insulating paper 119.

The two capacitors 2 arranged in each of the first and second regions 301 and 302 within the storage chamber 30, as can be seen in FIGS. 1 and 2, are laid to have side surfaces located close to each other. Each of the inward-facing portions 310 protrudes into an interval between the adjacent round corners of the capacitors 2 arranged close to each other. Each of the inward-facing portions 310, as clearly illustrated in FIGS. 1 and 4, has the groove 319 recessed in an outer surface thereof.

The discharge substrate 6 working as a heat-generating object is, as illustrated in FIGS. 1 and 3, disposed to face at least one of the two capacitors 2 arranged adjacent each other through the intervening inward-facing portion 31.

The discharge substrate 6 has discharging resistors, not shown, mounted thereon. The discharge substrate 6 is electrically connected to the capacitors 2 in the capacitor module 1. The discharge substrate 6 works to discharge electrical charge stored in the capacitor module 1. When electrical current flows through the discharge substrate 6, the discharge substrate 6 will generate heat.

The discharge substrate 6 faces the whole of a first one of the capacitors 2 arranged in the first region 301 in the direction Y. The first capacitor 2 is located adjacent the intervening inward-facing portion 31. An interval between the discharge substrate 6 and the capacitors 2 is filled with the sealing resin 4. The discharge substrate 6 also faces substantially the whole of a second one of the capacitors 2 arranged in the first region 301 in the direction Y. The second capacitor 2 is one of the capacitors 2 located outside in the direction X, in other words, farther away from the intervening inward-facing portion 31. The discharge substrate 6 also at least partially faces the intervening inward-facing portion 31 in the direction Y. In the example illustrated in FIG. 1, the discharge substrate 6 extends in the direction X to overlap a portion of the intervening inward-facing portion 31 in the direction Y. The discharge substrate 6 does not face the capacitors 2 disposed in the second region 302 in the direction Y.

The intervening inward-facing portion 31, as can be seen in FIG. 1, has a length or dimension L1 protruding in the direction Y. Specifically, the dimension L1 is more than or equal to half a dimension of the capacitor case 3 in the direction Y. In other words, the capacitor case 3 is shaped to have the dimension L2 in the direction Y. The dimension L1 is selected to meet a relation of L1≥L2/2.

The capacitor case 3 is, as illustrated in FIGS. 1, 2, and 4 equipped with the fastening portion 34 located outside the intervening inward-facing portion 31 for joining the capacitor module 1 with a given member. The fastening portion 34 has the contacting surface 341 placed in contact with the given member. The given member, as referred to herein, the device case 51 of the power converter 5 illustrated in FIG. 7. The device case 51 is made of, for example, metallic material such as aluminum.

Figure 7:
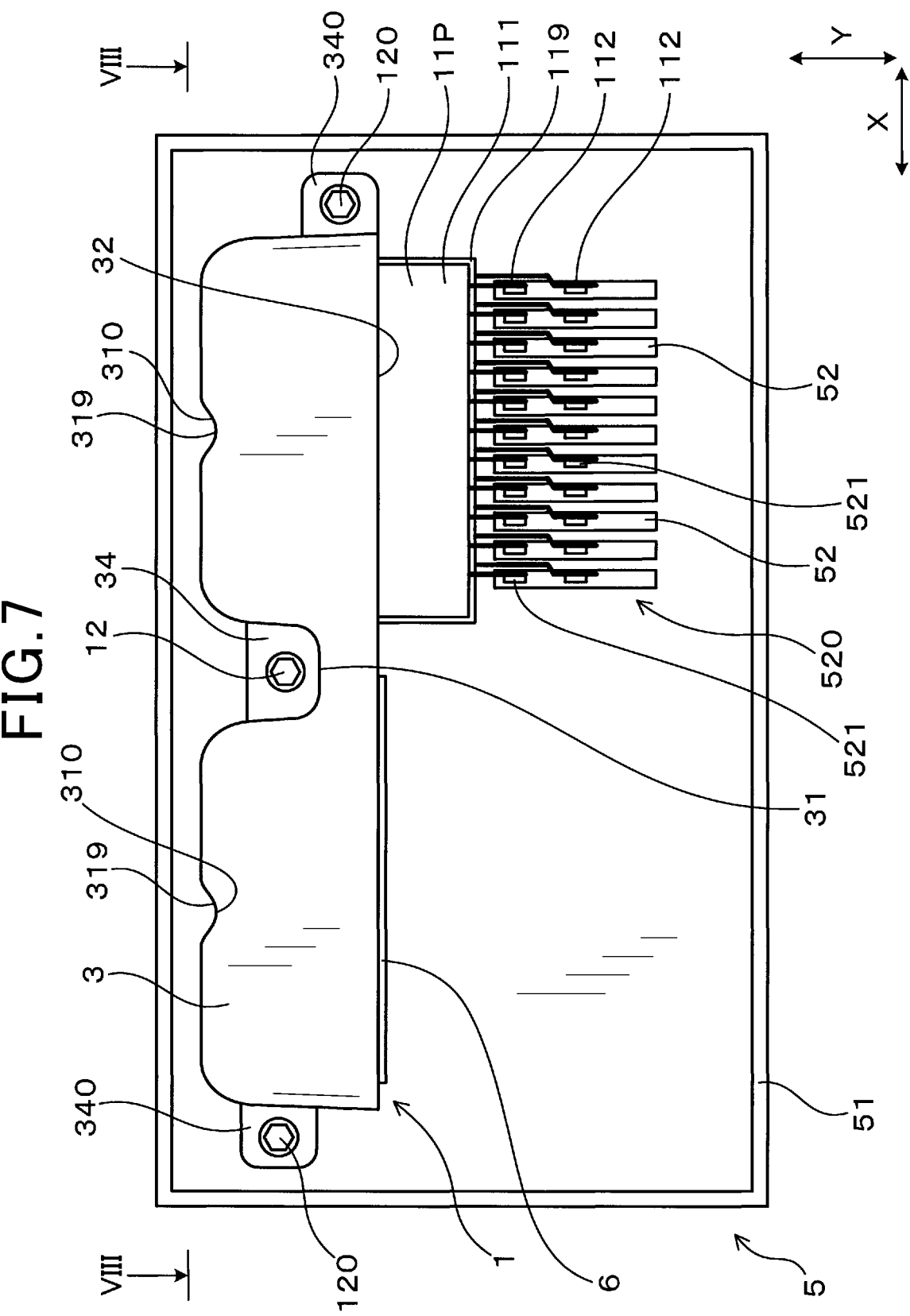
FIG. 7 is a plan view which illustrates a power converter equipped with a capacitor module according to the first embodiment.

The capacitor module 1 is, as can be seen in FIG. 7, one of component parts of the power converter 5. The power converter 5 also includes a plurality of semiconductor modules 52 mounted in the device case 51. The semiconductor modules 52 work as a switching circuit. The semiconductor modules 52 are laid to overlap each other in the direction X in the form of the semiconductor module stack 520.

Each of the semiconductor modules 52 is equipped with the power terminals 521 which protrude in the direction Z and to which the connecting terminals 112 of the capacitor bus bars 11P and 11N are joined.

The semiconductor module stack 520 and the capacitor module 1 are arranged adjacent each other in the direction Y. The capacitor module 1 is oriented to have the open surface 32 of the capacitor case 3 which faces the semiconductor module stack 520 in the direction Y. The capacitor bus bars 11P and 11N extend from the open surface 32 of the capacitor case 3 in the direction Y and are joined to the power terminals 521 of the semiconductor modules 52.

Figure 10:
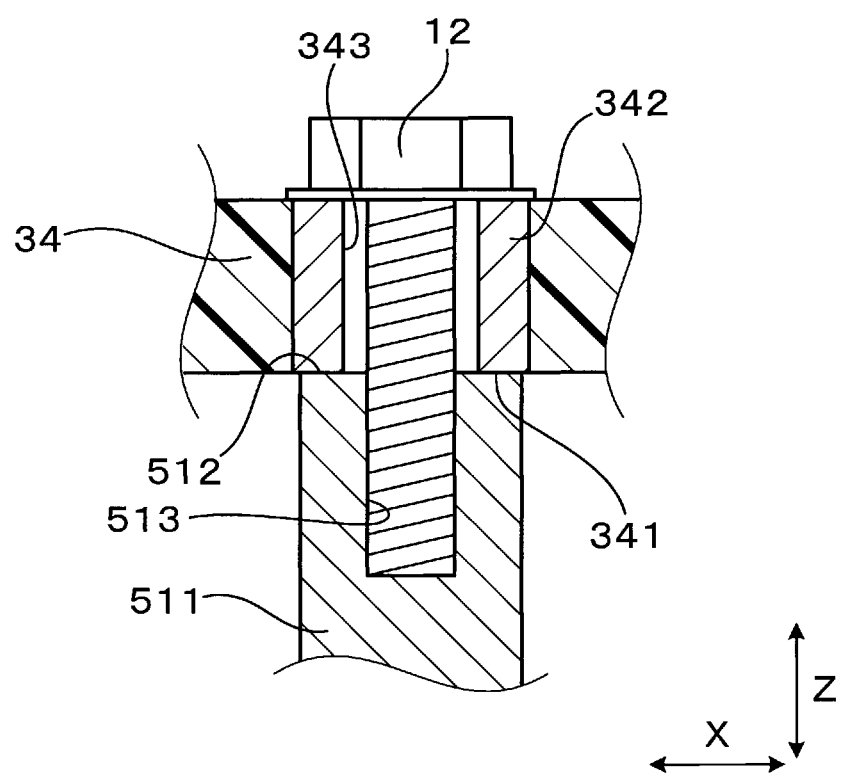
FIG. 10 is a sectional view which illustrates a structure of a fastening portion according to the first embodiment.

The capacitor module 1 is joined at the fastening portion 34 of the capacitor case 3 with the boss 511 of the device case 51. Specifically, the device case 51, as clearly illustrated in FIGS. 8 and 9, has the boss 511 extending in the direction Z. The boss 511, as illustrated in FIG. 10, has a top end serving as the seat 512 and the threaded hole 513 extending from the seat 512 in the direction Z.

The contacting surface 341 of the fastening portion 34 of the capacitor case 3 is placed in contact with the seat 512 of the boss 511. The fastening portion 34 has formed therein the bolt hole 343 extending therethrough in the direction Z. The bolt 12 passes through the bolt hole 343 and engages the threaded hole 513 of the boss 511 to achieve a firm joint of the fastening portion 34 with the boss 511, thereby securing the capacitor module 1 to the device case 51.

Figure 8:
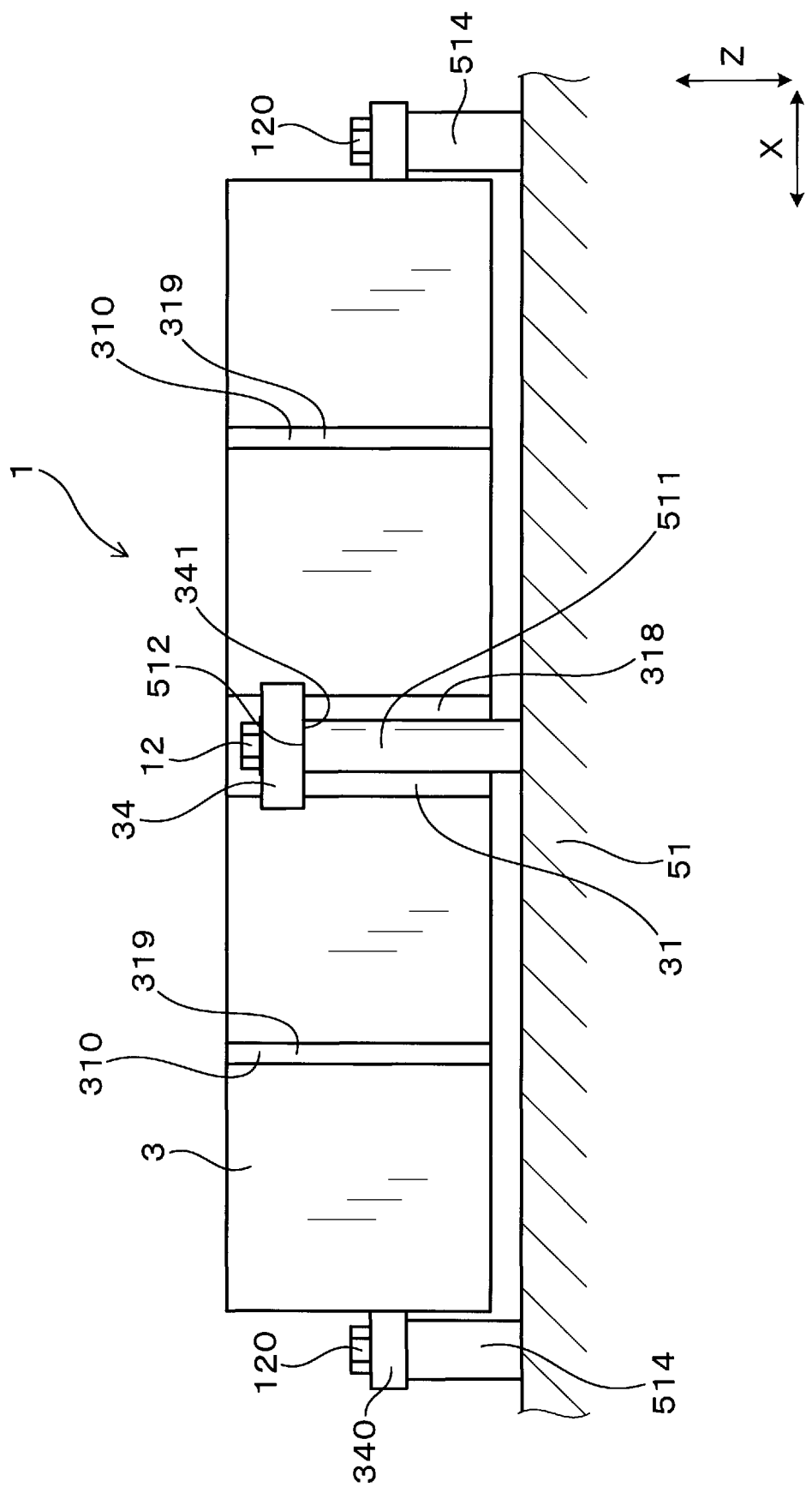
FIG. 8 is a sectional view taken along the line VIII-VIII in FIG. 7.
Figure 9:
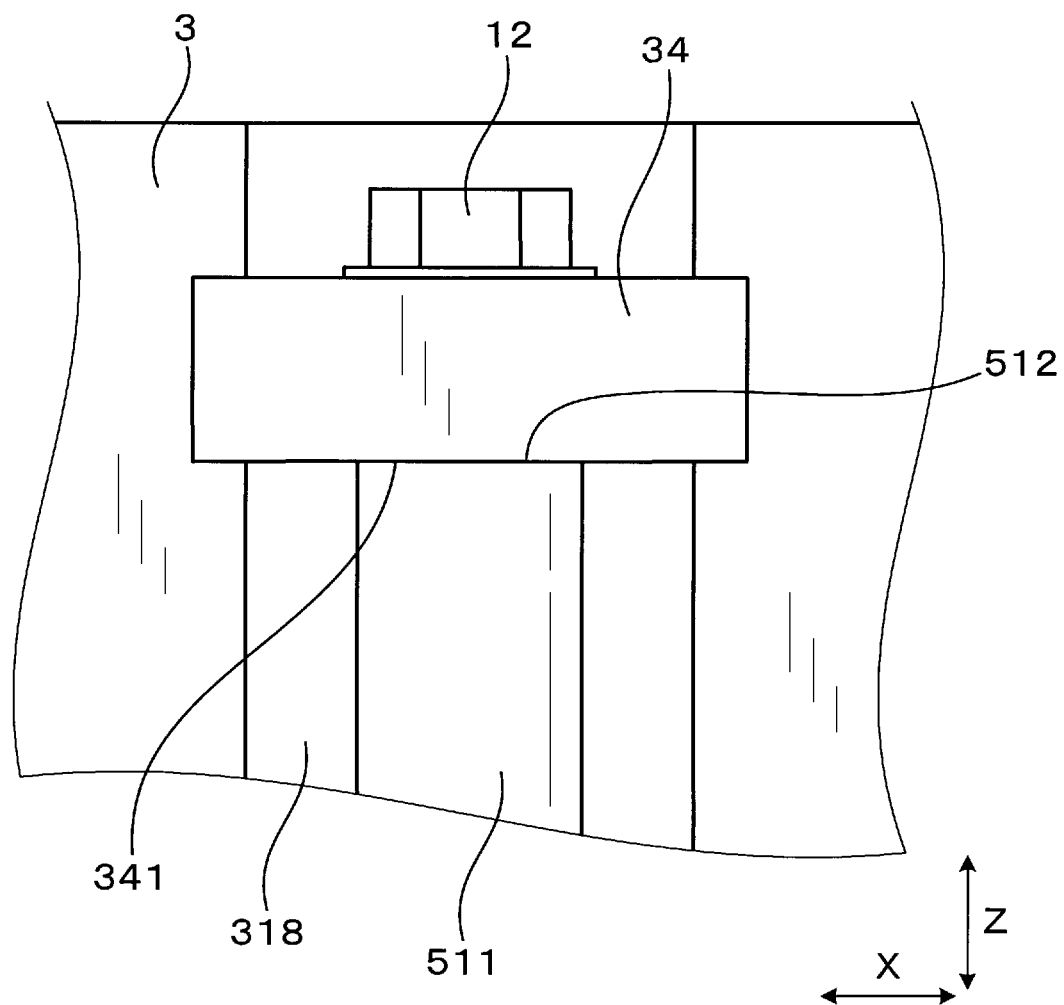
FIG. 9 is a front view which illustrates a structure of a fastening portion according to the first embodiment.

The capacitor case 3, as illustrated in FIGS. 7 and 8, also has the fastening portions 340 in addition to the fastening portion 34. The fastening portions 340 are secured to the device case 51 using the bolts 120. Specifically, the capacitor case 3 has the fastening portions 340 formed on ends thereof opposed to each other in the direction X. The fastening portions 340 are joined to the bosses 514 of the device case 51 using the bolts 120. The capacitor module 1 is joined to the device case 51 at three places: the fastening portion 34 and the two fastening portions 340. The bolts 12 and 120 passing through the fastening portions 34 and 340 each have an axis extending in the direction Z. The bolts 12 and 120 are fastened in the same direction.

The intervening inward-facing portion 31 of the capacitor case 3, as illustrated in FIGS. 1 and 2, has the outer recess 318 formed in an outer surface thereof. The outer recess 318 is shaped to have a depth in the direction Y. The depth of the outer recess 318 extends toward the open surface 32 across the line segment M. In other words, the outer surface of the intervening inward-facing portion 31 is recessed close to the open surface 32 across the line segment M in the direction Y to define the outer recess 318. The fastening portion 34 lies in a portion of the outer recess 318. The fastening portion 34 is shaped to be fully located inside the outer recess 318.

The contacting surface 341 of the fastening portion 34 faces in the height-wise direction Z. Specifically, the contacting surface 341, as clearly illustrated in FIG. 8, faces downward and is located above the middles of the capacitors 2 in the direction Z. The boss 511 of the device case 51 to which the fastening portion 34 is joined is located in a region occupying more than or equal to half the height of the capacitors 2 in the direction Z within the outer recess 318.

The fastening portion 34, as illustrated in FIGS. 1 and 10, includes at least the metallic member 342. The contacting surface 341 includes at least a surface of the metallic member 342. The metallic member 342 is of a hollow cylindrical shape. The metallic member 342 is insert-molded with resin that is material of the capacitor case 3. The metallic member 342 has ends which are opposed to each other in the lengthwise direction thereof and exposed outside the surface of the capacitor case 3. One of the ends of the metallic member 342 forms the contacting surface 341.

The metallic member 342 has an end surface (i.e., a lower surface, as viewed in FIG. 10) which forms a portion of the contacting surface 341 and has a diameter greater than that of the seat 512 of the boss 511. The lower end of the metallic member 342, therefore, has an outer circumference located outside the outer circumference of the seat 512 of the boss 511.

This embodiment offers the following beneficial advantages.

The capacitor case 3 of the capacitor module 1 is equipped with the intervening inward-facing portion 31. As viewed in the direction Z, the intervening inward-facing portion 31 is arranged to traverse the line segment M passing through the centers of the two adjacent capacitors 2. In other words, the intervening inward-facing portion 31 is located between adjacent two of the capacitors 2. This results in an increased interval between two of the capacitors 2 which are arranged adjacent each other across the intervening inward-facing portion 31, thereby reducing thermal interference between the adjacent capacitors 2.

The intervening inward-facing portion 31 that is a portion of the capacitor case 3 is interposed between the two adjacent capacitors 2, thereby decreasing accumulation of heat between the adjacent capacitors 2. Specifically, heat generated by one of the adjacent capacitors 2 is partially transmitted to the intervening inward-facing portion 31. The intervening inward-facing portion 31 is a portion of the capacitor case 3, so that the heat transmitted thereto is dissipated outside the capacitor case 3, thereby decreasing the accumulation of heat inside the capacitor module 1.

The capacitors 2 are arrayed in line. This layout further reduces the thermal interference between the capacitors 2 arranged on the opposite sides of the intervening inward-facing portion 31.

The first and second regions 301 and 302 which are on the opposite sides of the intervening inward-facing portion 31 have the same number of capacitors 2 mounted therein. This minimizes a difference in amount of generated heat between the first and second regions 301 and 302, which facilitates the ease with which a rise in temperature of the whole of the capacitors 2 is reduced.

The plurality of capacitors 2 are mounted in each of the first and second regions 301 and 302. This layout usually leads to a risk that one of the capacitors 2 thermally interferes with another, so that the temperature thereof rises. In order to alleviate such a problem, the capacitor case 3 has the intervening inward-facing portion 31 to minimize the thermal interference between the capacitors 2.

The discharge substrate 6 that is the heat generating object is disposed to face at least one of the capacitors 2 arranged adjacent each other across the intervening inward-facing portion 31. This capacitor 2 is, therefore, subjected to the thermal interference with the heat generating object. The intervening inward-facing portion 31 is located close to this one of the capacitors 2 and thus serves to reduce a rise in temperature of the one of the capacitors 2.

The intervening inward-facing portion 31, as described above, has the dimension L1 which protrudes in the direction Y and is more than or equal to half a dimension of the capacitor case 3 in the direction Y. This decreases the thermal interference between the first and second regions 301 and 302 of the storage chamber 30 which are located on the opposite sides of the intervening inward-facing portion 31 within the capacitor case 3. In other words, the above configuration of the intervening inward-facing portion 31 results in a decreased size of the connecting path 303, thus further decreasing the thermal interference between the first and second regions 301 and 302.

The capacitor case 3 has the fastening portion 34 arranged outside the intervening inward-facing portion 31. The fastening portion 34 is equipped with the contacting surface 341 placed in contact with a given member (i.e., the device case 51). This facilitates the ease with which the heat generated by the capacitors 2 is transmitted from the intervening inward-facing portion 31 to the given member through the fastening portion 34. In other words, the heat is dissipated from the intervening inward-facing portion 31 which is subjected to heat generated by the two adjacent capacitors 2 through the fastening portion 34.

The contacting surface 341 is located above the middles of the capacitors 2 in the direction Z, thereby causing a member (i.e., the boss 511 of the device case 51) joined to the fastening portion 34 to be arranged in the region occupying half the height of the capacitors 2 or more within the outer recess 318 in the direction Z. The boss 511 will, therefore, be sensitive to the heat generated by the capacitors 2, thereby enhancing the dissipation of heat generated by the capacitors 2.

At least a portion of the fastening portion 34 is made of the metallic member 342. At least a portion of the contacting surface 341 is made of the surface of the metallic member 342. This enhances the dissipation of heat from the fastening portion 34 to the given member (i.e., the device case 51) in the capacitor module 1.

As apparent from the above discussion, the capacitor module 1 in this embodiment is capable of minimizing the thermal interference between the capacitors.

Second Embodiment

The capacitor module 1 in the second embodiment, as illustrated in FIGS. 11 to 14, has the contacting surface 341 of the fastening portion 34 which faces in the direction Y. Specifically, the contacting surface 341 faces in a direction opposite a direction in which the intervening inward-facing portion 31 protrudes.

The metallic member 342 is insert-molded with the capacitor case 3 so as to have an axis thereof oriented in the direction Y.

Figure 11:
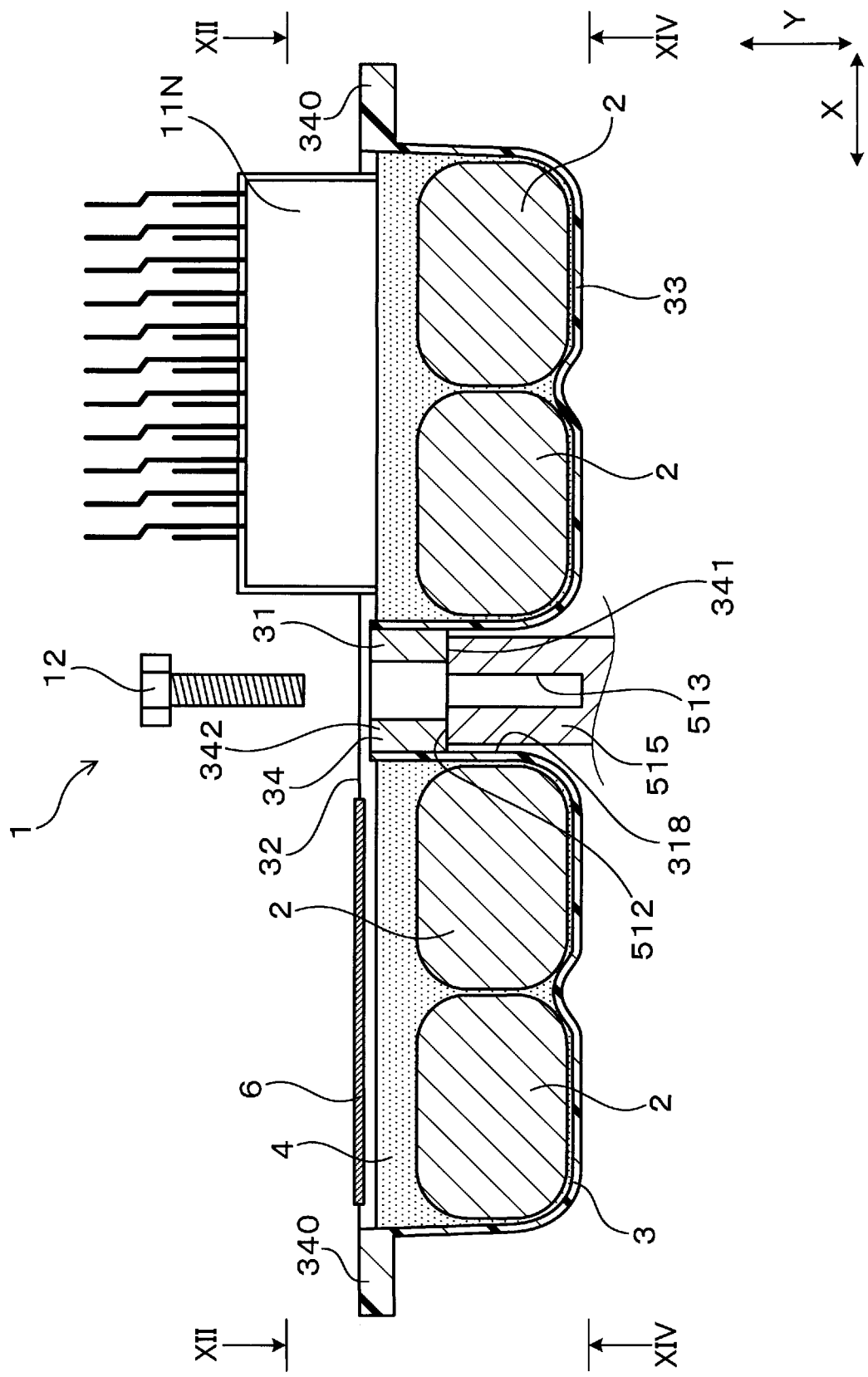
FIG. 11 is a sectional view which illustrates a capacitor module according to the second embodiment.
Figure 12:
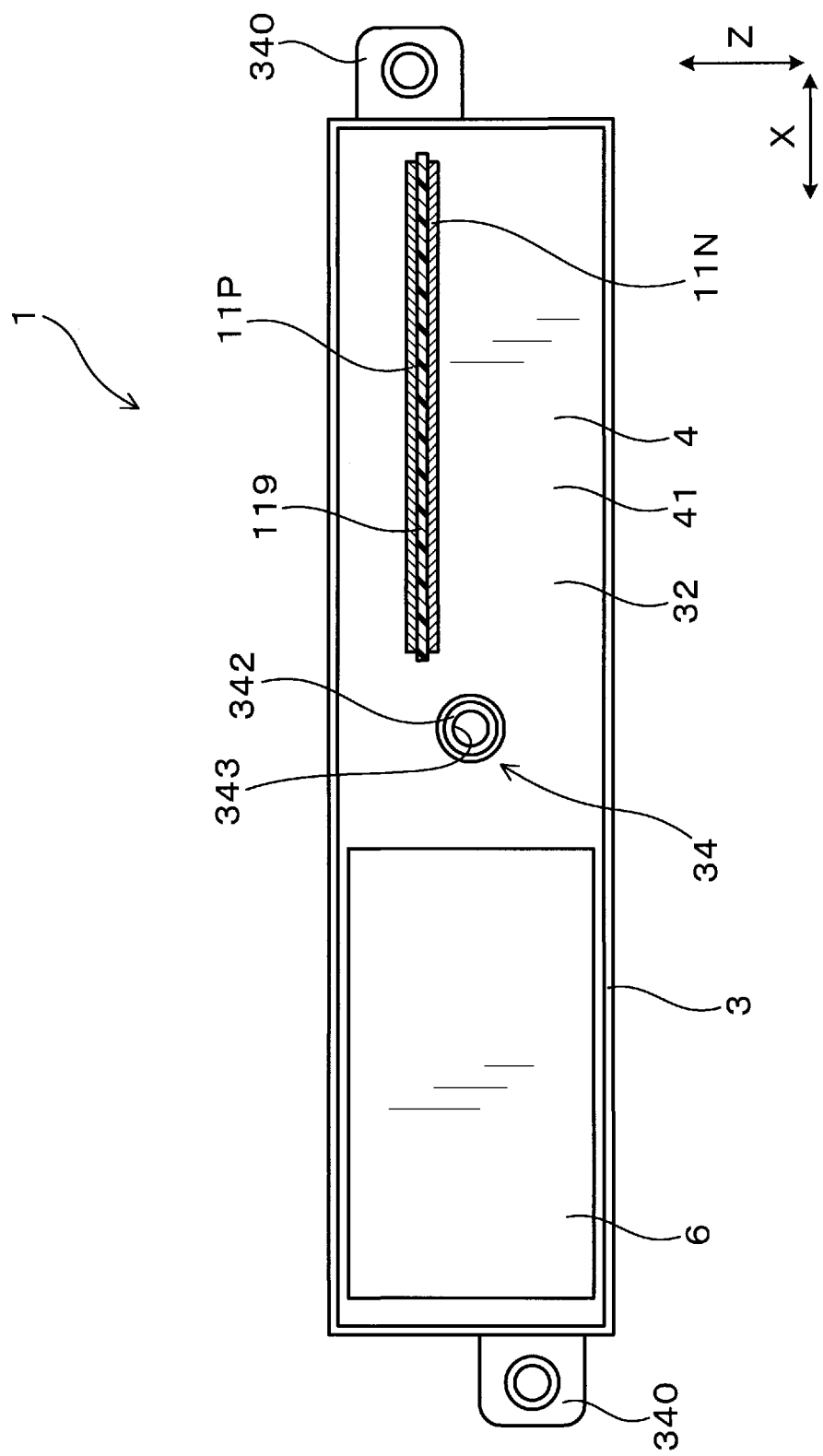
FIG. 12 is a sectional view taken along the line XII-XII in FIG. 11.
Figure 13:
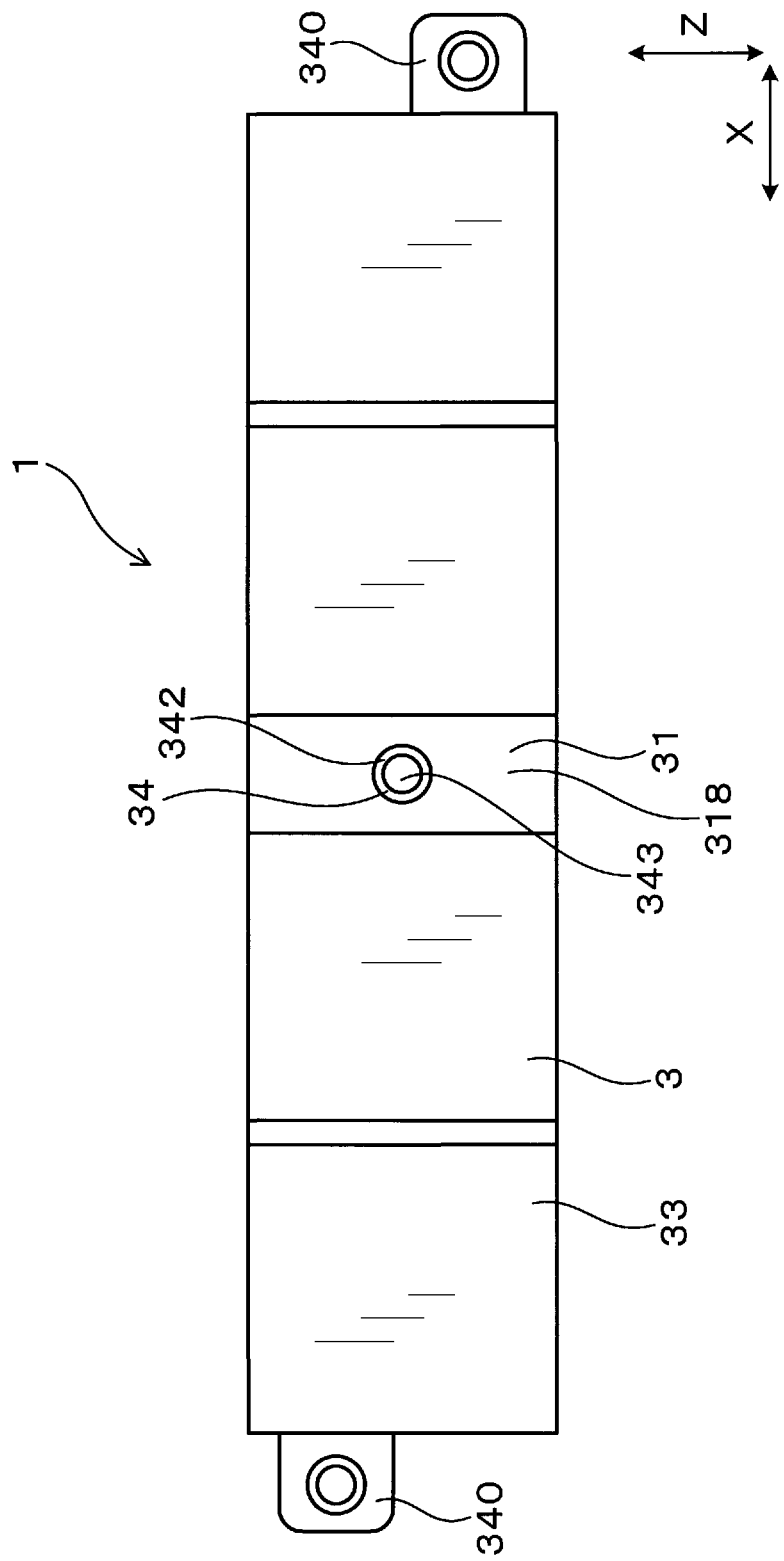
FIG. 13 is a back view which illustrates a capacitor module, as viewed from a bottom wall thereof according to the second embodiment.

The metallic member 342 has a first end that is a lower one, as viewed in FIG. 11, of ends opposed to each other in an axial direction thereof. The first end is, as clearly illustrated in FIGS. 11 and 13, exposed outside the capacitor case 3 and faces away from the open surface 32 in the direction Y. The first end forms at least a portion of the contacting surface 341 of the fastening portion 34. The metallic member 342, as can be seen in FIGS. 11 and 12, also has a second end that is an upper one of the ends thereof, as viewed in FIG. 11. The second end faces away from the contacting surface 341 and is exposed outside the capacitor case 3 and the sealing resin 4.

The capacitor case 3 is also equipped with the fastening portions 340 formed on outer surfaces of the ends thereof which are opposed to each other across the intervening inward-facing portion 31. Each of the fastening portions 340 is oriented to have a direction in which it is fastened to, for example, the device case 51 and which coincides with the direction Y. Specifically, the fastening portions 340 which are located on the ends of the capacitor case 3 opposed to each other in the direction X have major surfaces facing in the direction Y.

Figure 14:
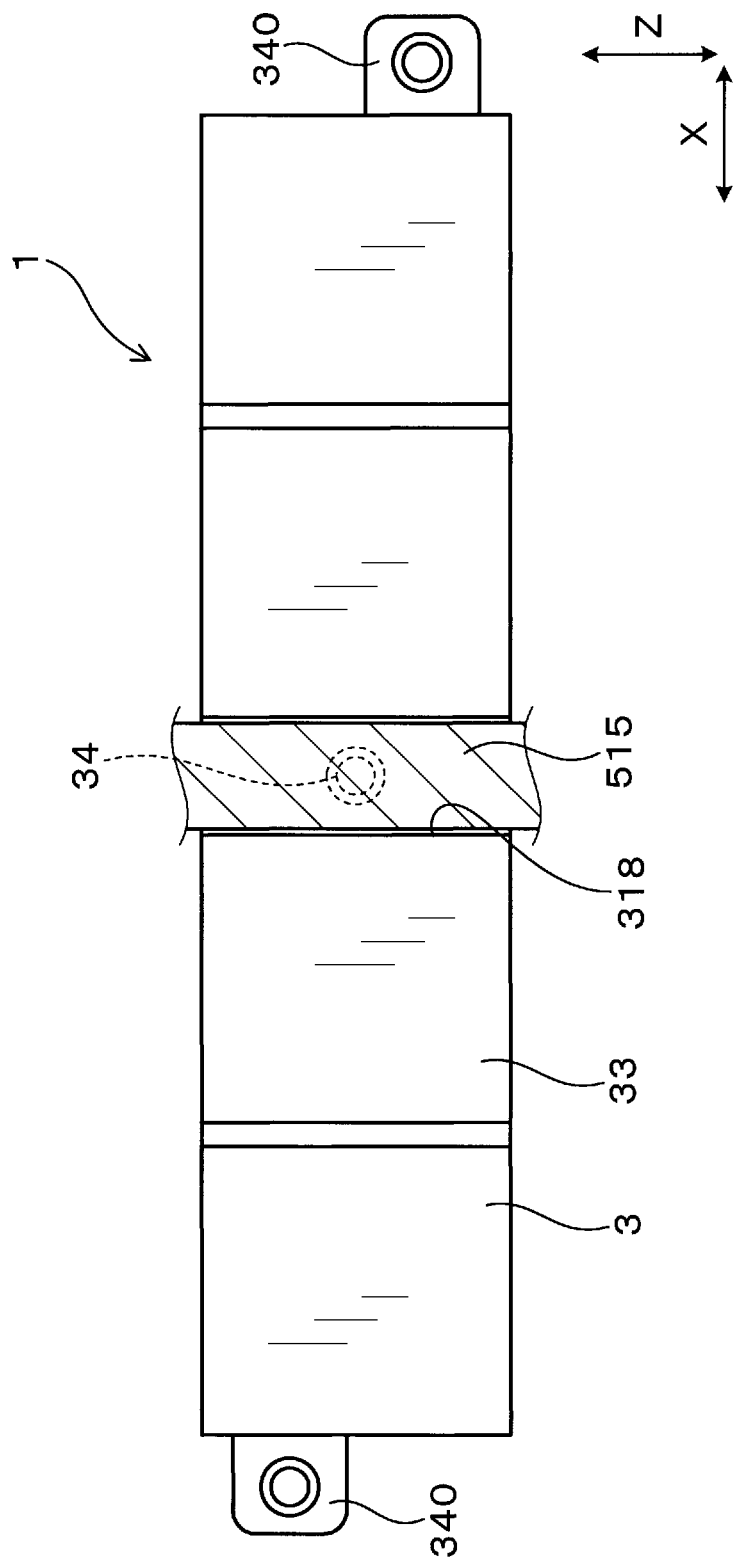
FIG. 14 is a sectional view taken along the line XIV-XIV in FIG. 11.

Joining of the capacitor module 1 to the device case 51 is, as illustrated in FIGS. 11 and 14, achieved by placing the capacitor module 1 to arrange the fastened portion 515 of the device case 51 in the outer recess 318 of the intervening inward-facing portion 31, placing the contacting surface 341 of the fastening portion 34 on the seat 512 of the fastened portion 515, inserting the bolt 12 into the bolt hole 343 of the fastening portion 34, and then tightening the bolt 12 to engage the threaded hole 513 of the fastened portion 515.

Similarly, the fastening portions 340 are secured to the device case 51 using bolts, not shown, in the same way as described above.

The fastened portion 515 is, as illustrated in FIG. 14, fully occupies the whole of the outer recess 318 of the capacitor case 3. Specifically, the fastened portion 515 occupies the outer recess 318 both in the direction Z and in the direction Y. The fastened portion 515 also occupies substantially the whole of the outer recess 310 in the direction X.

Other arrangements of the capacitor module 1 are the same as those in the first embodiment. In embodiments following the second embodiment, the same or similar reference numbers, as employed in the previous embodiments, will refer to the same parts unless otherwise specified.

The capacitor module 1 of this embodiment is designed to facilitate the ease with which the fastened portion 515 is disposed in the outer recess 318 of the intervening inward-facing portion 31, thereby enhancing the dissipation of heat outside the capacitor module 1 through the intervening inward-facing portion 31.

The second embodiment offers substantially the same other beneficial advantages as those in the first embodiment.

Third Embodiment

Figure 15:
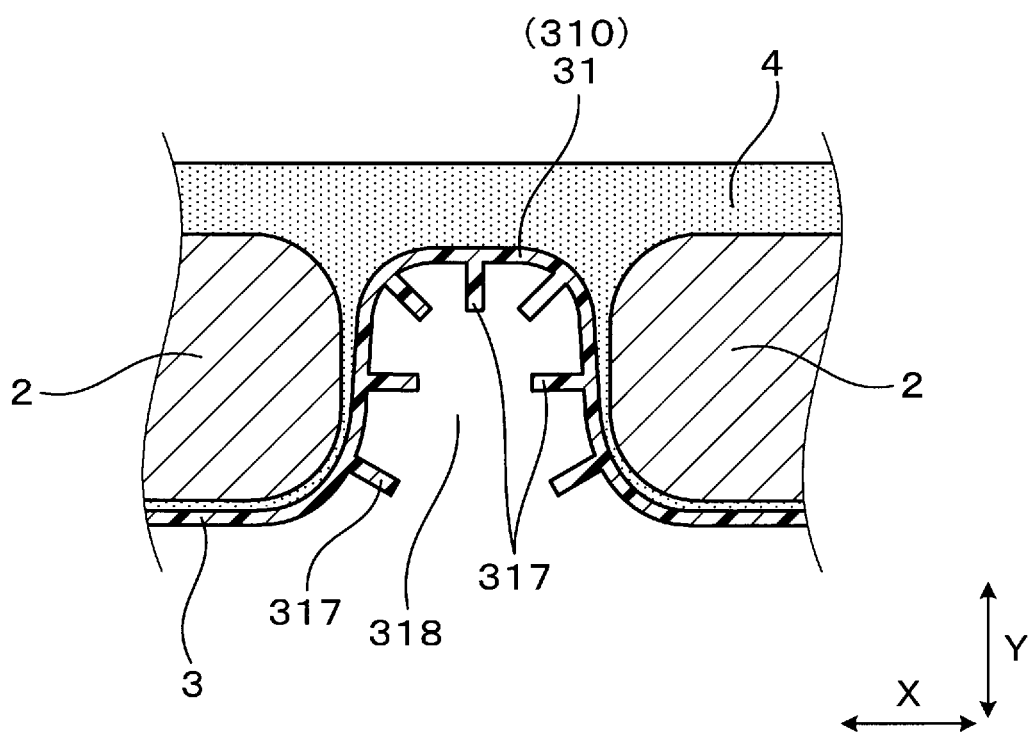
FIG. 15 is a sectional view which illustrates a region around an intervening inward-facing portion of a capacitor module according to the third embodiment.

The capacitor module 1 in the third embodiment has the capacitor case 3 which is, as illustrated in FIG. 15, equipped with a plurality of heat dissipating fins 317 disposed on an outer surface of the intervening inward-facing portion 31. The heat dissipating fins 317 protrude from an outer wall of the capacitor case 3 which forms the intervening inward-facing portion 31 into the outer recess 318.

The heat dissipating fins 317 is formed integrally with resin making up the outer wall of the capacitor case 3.

Other arrangements of the capacitor module 1 are the same as those in the first embodiment.

The use of the heat dissipating fins 317 arranged on the outer surface of the intervening inward-facing portion 31 enhances the dissipation of heat from the capacitor module 1. Specifically, the capacitor module 1 of this embodiment is designed to have heat releasing paths extending from the intervening inward-facing portion 31 disposed between the two adjacent capacitors 2 to the heat dissipating fins 317 for releasing the heat outside the capacitor case 3, thereby improving the release of the heat generated inside the capacitor module 1.

Fourth Embodiment

Figure 16:
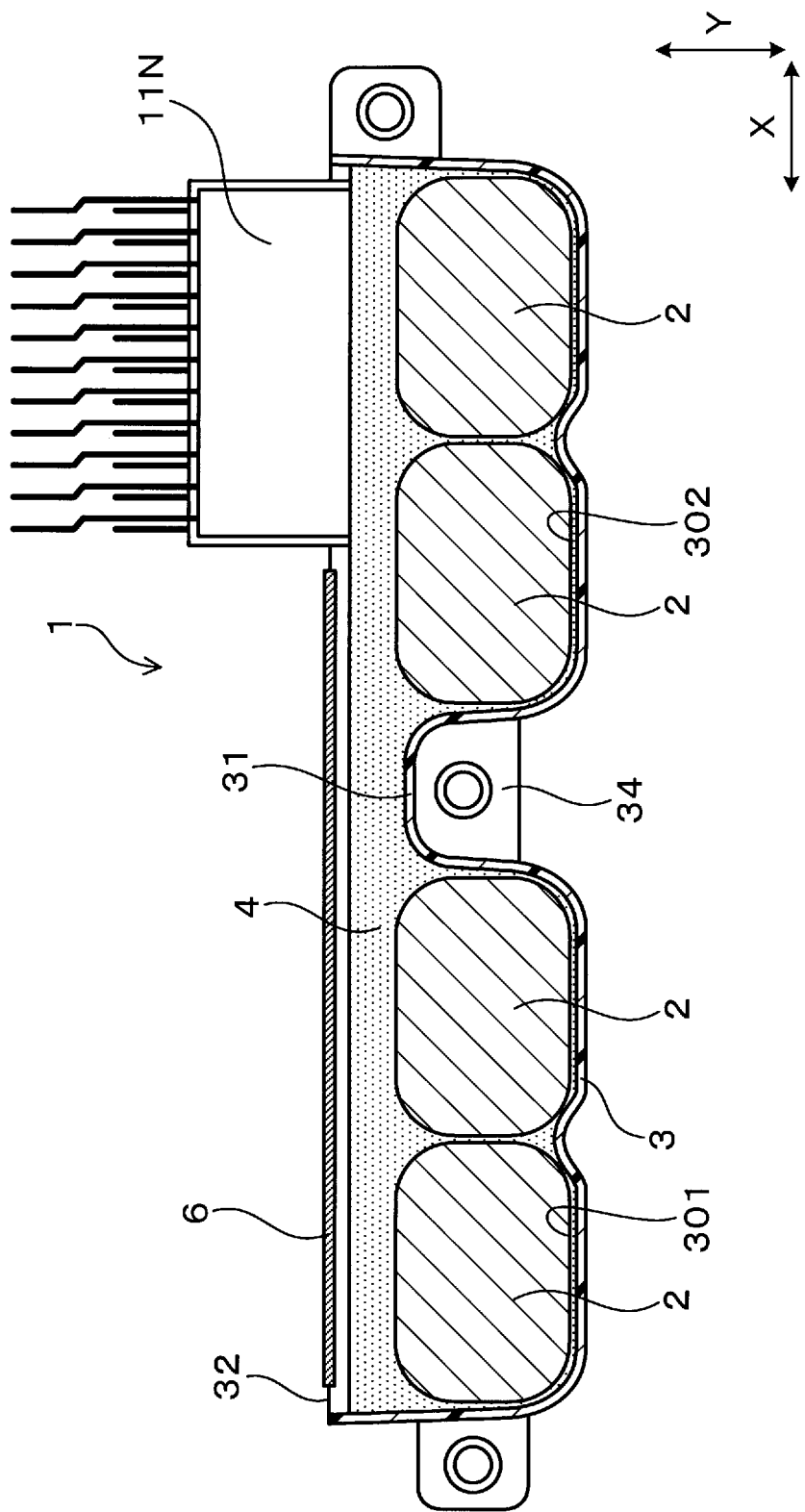
FIG. 16 is a sectional view which illustrates a capacitor module according to the fourth embodiment.

The capacitor module 1 in the fourth embodiment is, as illustrated in FIG. 16, equipped with the discharge substrate 6 which has a major surface extending in the direction X to fully face the intervening inward-facing portion 31 in the direction Y.

Specifically, the major surface of the discharge substrate 6 extends over, that is, overlaps both the first and second regions 301 and 302 defined by the intervening inward-facing portion 31 in the direction Y. The discharge substrate 6 also faces or overlaps one of the capacitors in the direction Y which is located in the second region 302 in which the capacitor bus bars 11P and 11N protrude and which is closer to the intervening inward-facing portion 31. Specifically, the discharge substrate 6 overlaps one-half or more of the width of the one of the capacitors 2 in the direction X which is located closer to the intervening inward-facing portion 31 in the second region 302.

Other arrangements of the capacitor module 1 are the same as those in the first embodiment.

The capacitor module 1 of this embodiment is, as described above, equipped with the two capacitors 2 which are located on the opposite sides of the intervening inward-facing portion 31 and face the discharge substrate 6 in the direction Y, so that the temperature of those capacitors 2 will rise. The intervening inward-facing portion 31 serves to absorb the heat of the discharge substrate 6.

The fourth embodiment offers substantially the same other beneficial advantages as those in the first embodiment.

Fifth Embodiment

Figure 17:
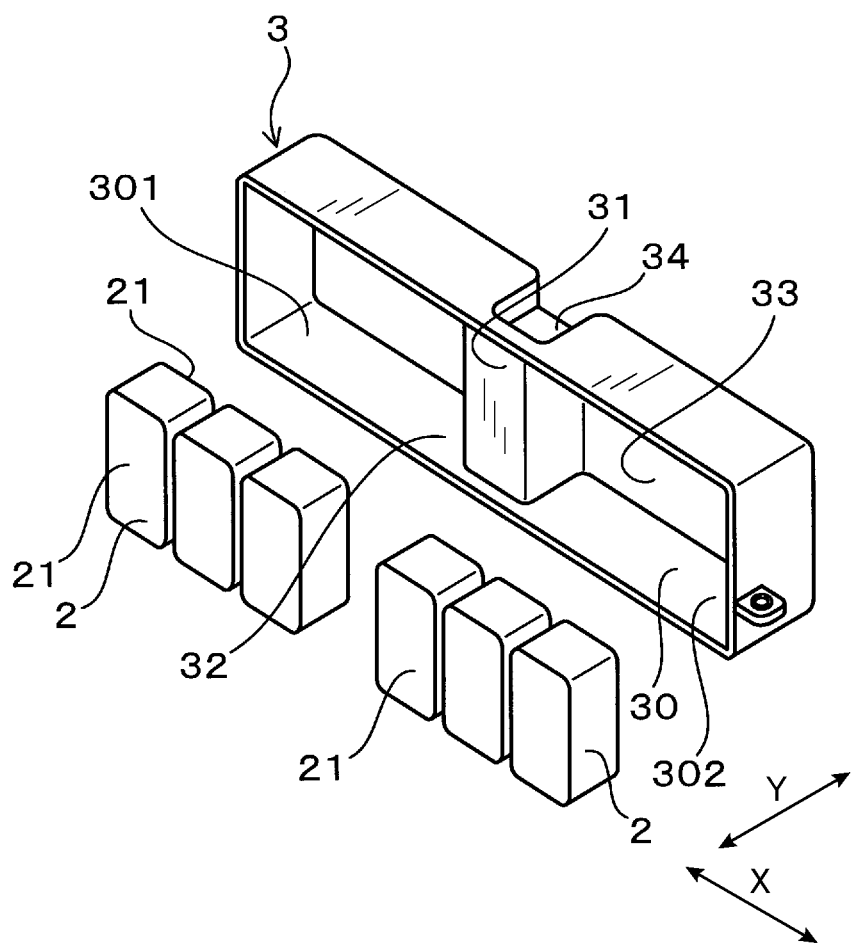
FIG. 17 is an exploded perspective view which illustrates a capacitor module according to the fifth embodiment.

The capacitor module 1 in this embodiment is, as illustrated in FIGS. 17 to 19, designed to have the capacitors 2 disposed inside the capacitor case 3 with the winding axial direction of the capacitors 2 oriented in the direction Y.

Specifically, the direction in which intervening inward-facing portion 31 protrudes, as can be seen in FIGS. 17 and 18, coincides with the winding axial direction of the capacitors 2. In other words, the electrode surfaces 21 of the capacitors 2 face in the direction Y, so that one of the electrode surfaces 21 of each of the capacitors 2 faces the open surface 32, while the other electrode surface 21 faces the bottom wall 33.

The capacitor module 1 is, as illustrated in FIGS. 18 and 19, also designed to have the three capacitors 3 mounted in each of the first and second regions 301 and 302 of the storage chamber 30 in the capacitor case 3.

Other arrangements of the capacitor module 1 are the same as those in the first embodiment.

The fifth embodiment offers substantially the same other beneficial advantages as those in the first embodiment.

Sixth Embodiment

The capacitor module 1 of this embodiment is, as illustrated in FIG. 20, designed to have different numbers of the capacitors 3 arranged in the first and second regions 301 and 302 of the storage chamber 30 in the capacitor case 3.

Specifically, the two capacitors 2 are mounted in the first region 301 facing the discharge substrate 6 in the direction Y, while the three capacitors 2 are arranged in the second region 302.

Other arrangements are identical with those in the fifth embodiment.

The sixth embodiment offers substantially the same other beneficial advantages as those in the first embodiment.

Seventh Embodiment

The capacitor module 1 of this embodiment is, as illustrated in FIG. 21, designed to have the numbers of the capacitors 2 disposed in the first and second regions 301 and 302 which are opposite those in the sixth embodiment in FIG. 20.

Specifically, the three capacitors 2 are mounted in the first region 301 facing the discharge substrate 6 in the direction Y, while the two capacitors 2 are arranged in the second region 302.

Other arrangements are identical with those in the sixth embodiment.

The seventh embodiment offers substantially the same other beneficial advantages as those in the first embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, the capacitor module 1 may alternatively be designed to have a plurality of arrays of the capacitors 2 which are arranged away from each other, for example, in the direction Y.

What is claimed is:

1. A capacitor module comprising:
   a plurality of capacitors;
   a capacitor case in which the capacitors are disposed; and
   a sealing resin with which the capacitor case is filled to seal the capacitors,
   wherein the capacitor case has inward-facing portions which are formed by portions of an outer wall of the capacitor case and protrude inward between every adjacent two of the capacitors,
   wherein at least one of the inward-facing portions is an intervening inward-facing portion, and as viewed in a height-wise direction perpendicular both to a direction in which the inward-facing portions protrude and to a direction in which two of the capacitors adjacent each other across one of the inward-facing portions are aligned, the intervening inward-facing portion traverses a line segment passing through center points of the two adjacent capacitors,
   wherein the plurality of capacitors are all arranged in line,
   wherein at least two of the plurality of the capacitors are disposed in a first region and at least two others of the plurality of capacitors are disposed in a second region, the first region and the second region being located on the opposite sides of the intervening inward-facing portion, and
   wherein a same number of the capacitors are disposed in the first region as are disposed in the second region.

2. A capacitor module as set forth in claim 1, wherein a heat generating member is disposed to face at least one of the two capacitors arranged adjacent each other across the intervening inward-facing portion.

3. A capacitor module as set forth in claim 1, wherein the intervening inward-facing portion has a dimension which is more than or equal to half a dimension of the capacitor case in the direction in which the intervening inward-facing portion protrudes.

4. A capacitor module as set forth in claim 1, wherein the capacitor case has a fastening portion which is disposed on an outer surface of the intervening inward-facing portion to fasten the capacitor module to a given member, and wherein the fastening portion has a contacting surface which is placed in contact with the given member.

5. A capacitor module as set forth in claim 4, wherein the contacting surface is oriented to face in the height-wise direction, and wherein when facing downward in the height-wise direction, the contacting surface is located above centers of the capacitors in the height-wise direction.

6. A capacitor module as set forth in claim 4, wherein the fastening portion has at least a portion made of a metallic member, wherein the contacting surface has at least a portion made of a surface of the metallic member.

7. A capacitor module as set forth in claim 4, wherein the contacting surface faces in a direction opposite the intervening inward-facing portion.

8. A capacitor module as set forth in claim 1, wherein the capacitor case is equipped with a heat dissipating fin disposed outside the intervening inward-facing portion.

* * * * *